Figure 5:
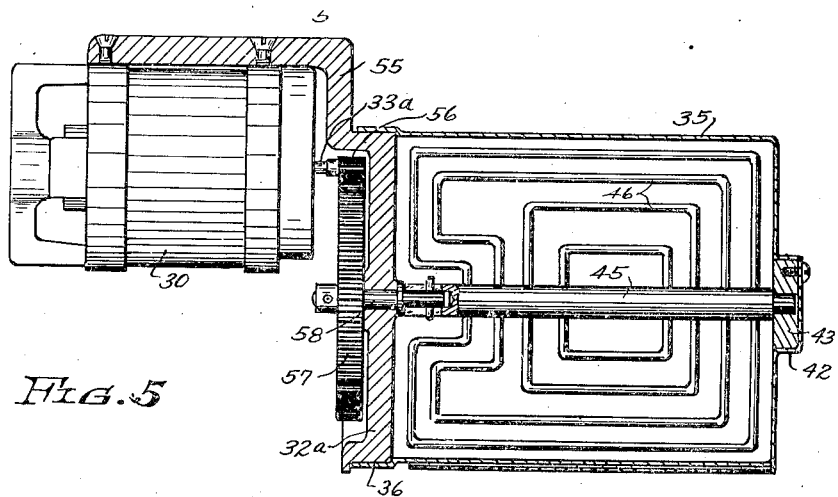

July 14, 1936.　　A. R. GOLRICK ET AL　　2,047,467
REFRIGERATION APPARATUS
Original Filed July 22, 1930　　5 Sheets-Sheet 1
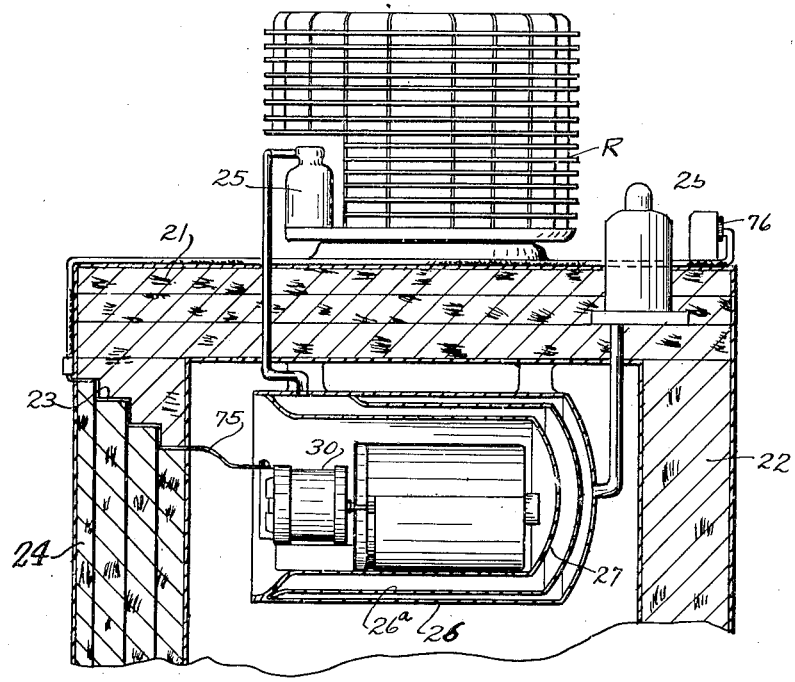
Fig. 1
Fig. 1a
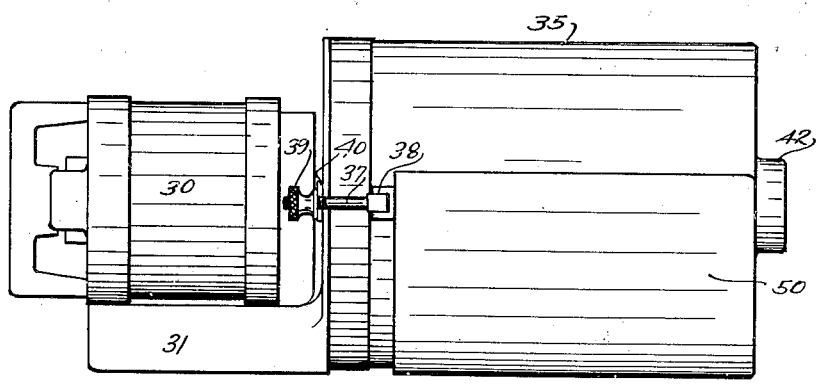
Fig. 2
Inventors
Albert R. Golrick
and
Julius H. Hildebrandt
By Bates, Golrick & Teare
Attorneys

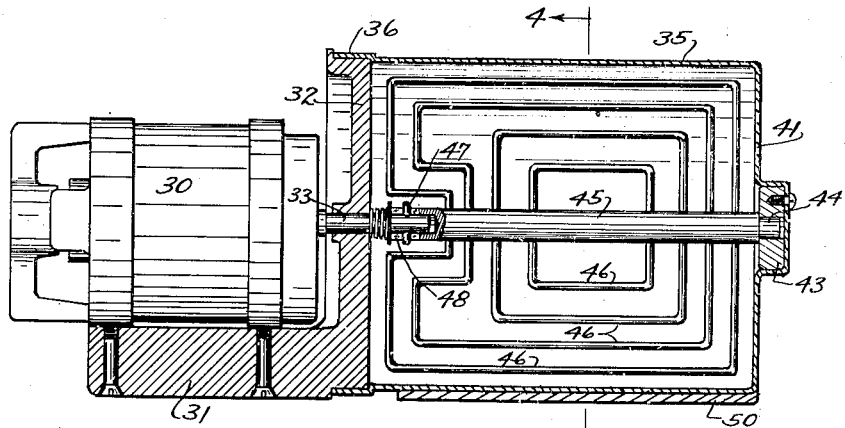
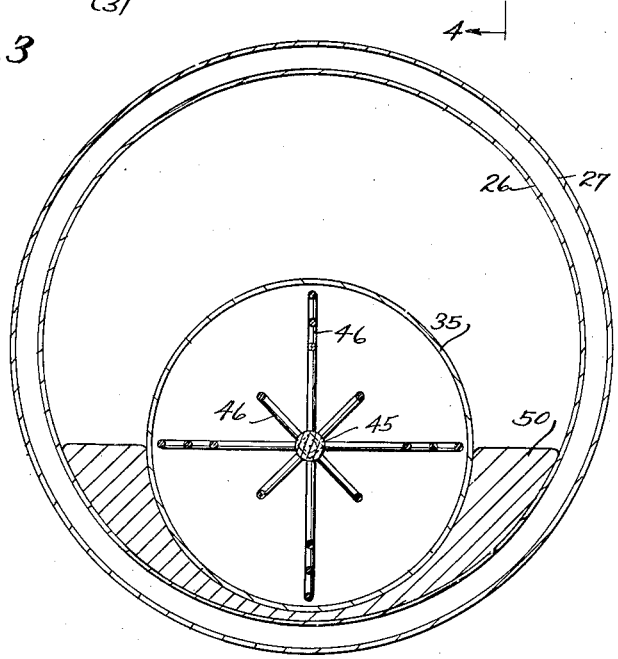

July 14, 1936.  A. R. GOLRICK ET AL  2,047,467
REFRIGERATION APPARATUS
Original Filed July 22, 1930   5 Sheets-Sheet 4

Albert R. Golrick
and
Julius H. Hildebrandt  Inventors
By Bates, Golrick & Teare
Attorneys July 14, 1936.  A. R. GOLRICK ET AL  2,047,467
REFRIGERATION APPARATUS
Original Filed July 22, 1930   5 Sheets-Sheet 5

Inventors
Albert R. Golrick
and
Julius H. Hildebrandt
By Bates, Golrick & Teare
Attorney Patented July 14, 1936

2,047,467

UNITED STATES PATENT OFFICE 2,047,467

REFRIGERATION APPARATUS

Albert R. Golrick, Cleveland Heights, and Julius H. Hildebrandt, Cleveland, Ohio Application July 22, 1930, Serial No. 469,806
Renewed September 10, 1935

14 Claims. (Cl. 62—114)

This invention relates to mixing devices and more particularly to a device for mixing and stirring food materials while they are being frozen, although the device may also be adapted to other uses.

In recent years, the use of domestic mechanical refrigerators has become increasingly widespread, and with the advent of such refrigerators, the popularity of healthful, frozen food, such as various kinds of ice-creams, ices and sherbets, has greatly increased. It is well known, however, that in order to produce high-quality ice-cream, etc., having a smooth and uniform texture, it is necessary to stir the food material during the freezing process. Accordingly, a general object of our invention is the provision of a power-driven mixing device, comprising a unitary mechanism which may be conveniently placed in the refrigerating chamber of an ordinary domestic refrigerator.

Another object is to provide a mixing device which may be adapted to a plurality of uses. A further object is to provide an electrically-driven device for freezing ice-cream, in which the electric motor will be shut off automatically when the material being frozen has reached the desired consistency. A further object is to provide a variable speed driving connection between the motor and the agitator of the mixing device, so that the motor may revolve at substantially constant speed while the agitator slows down as the food congeals. A still further object is to provide an ice-cream freezer adapted for use in a domestic mechanical refrigerator, in which heat will be conducted rapidly and efficiently from food to be frozen to the cooling medium.

Further novel features and objects of our invention will appear from the following description of preferred forms thereof, which refers to the accompanying drawings. The essential characteristics are summarized in the appended claims.

Briefly, a machine made according to our invention comprises a suitable electric motor mounted on a flanged plate, and a substantially cylindrical food container, which is adapted to be secured to the flanged plate. A mixing member is supported within the container, and various means are provided for drivingly connecting the member to the motor shaft. The motor, container and mixing member may be readily assembled to provide a unitary mechanism which may be conveniently placed within the freezing chamber of a domestic refrigerator.

The container may be supported within the refrigerating chamber by means of a shoe formed of a material having a high heat conductivity and adapted to contact with the exterior surface of the container and the interior surface of the refrigerating chamber, thus providing a path of high conductivity from the food substances to the refrigerant. A stand is provided for supporting the motor when it is desired to mix the food outside of the refrigerator. The motor shaft is provided with a simple type of bayonet lock, so that various different mixing devices may be easily secured thereto. Electric power is supplied to the motor through a flat conductor which may extend through the space between the door and the door frame of the refrigerator, and a resistance speed control having a thermal overload switch associated therewith, may be disposed exteriorly of the refrigerator.

Figure 6:
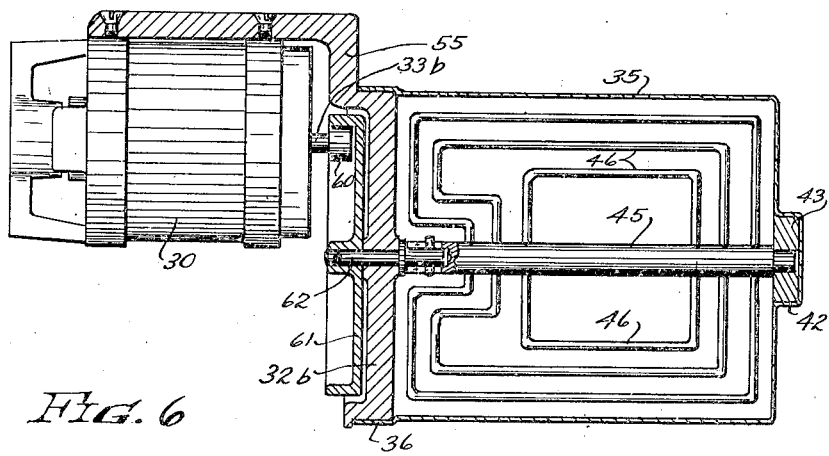
Figure 7:
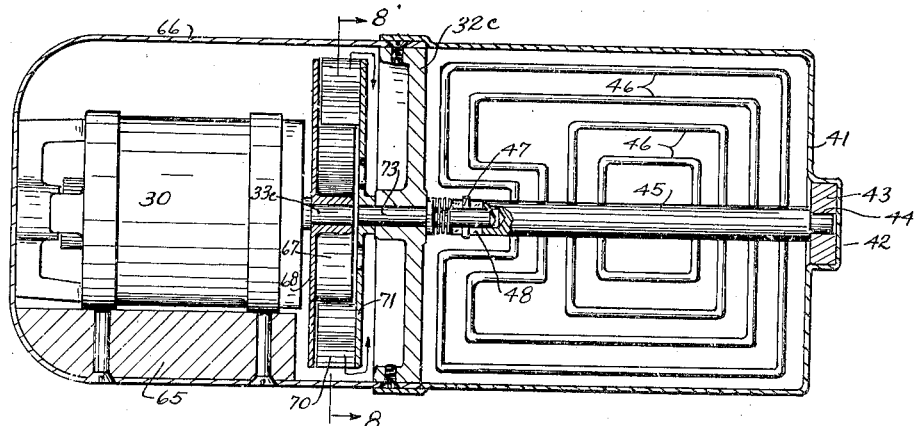
Figure 8:
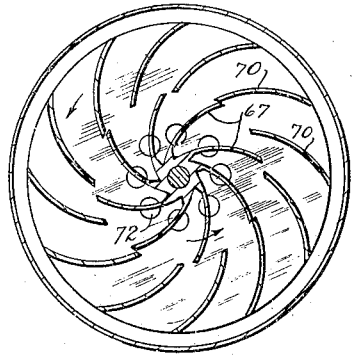
Figure 11:
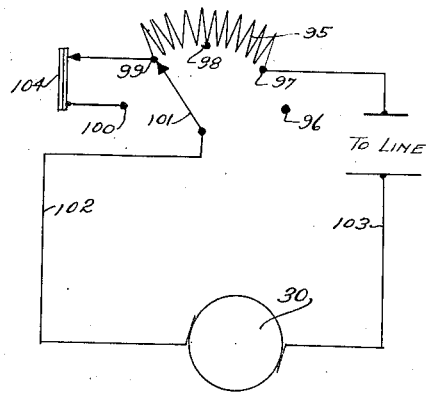
Figures 9, 10:
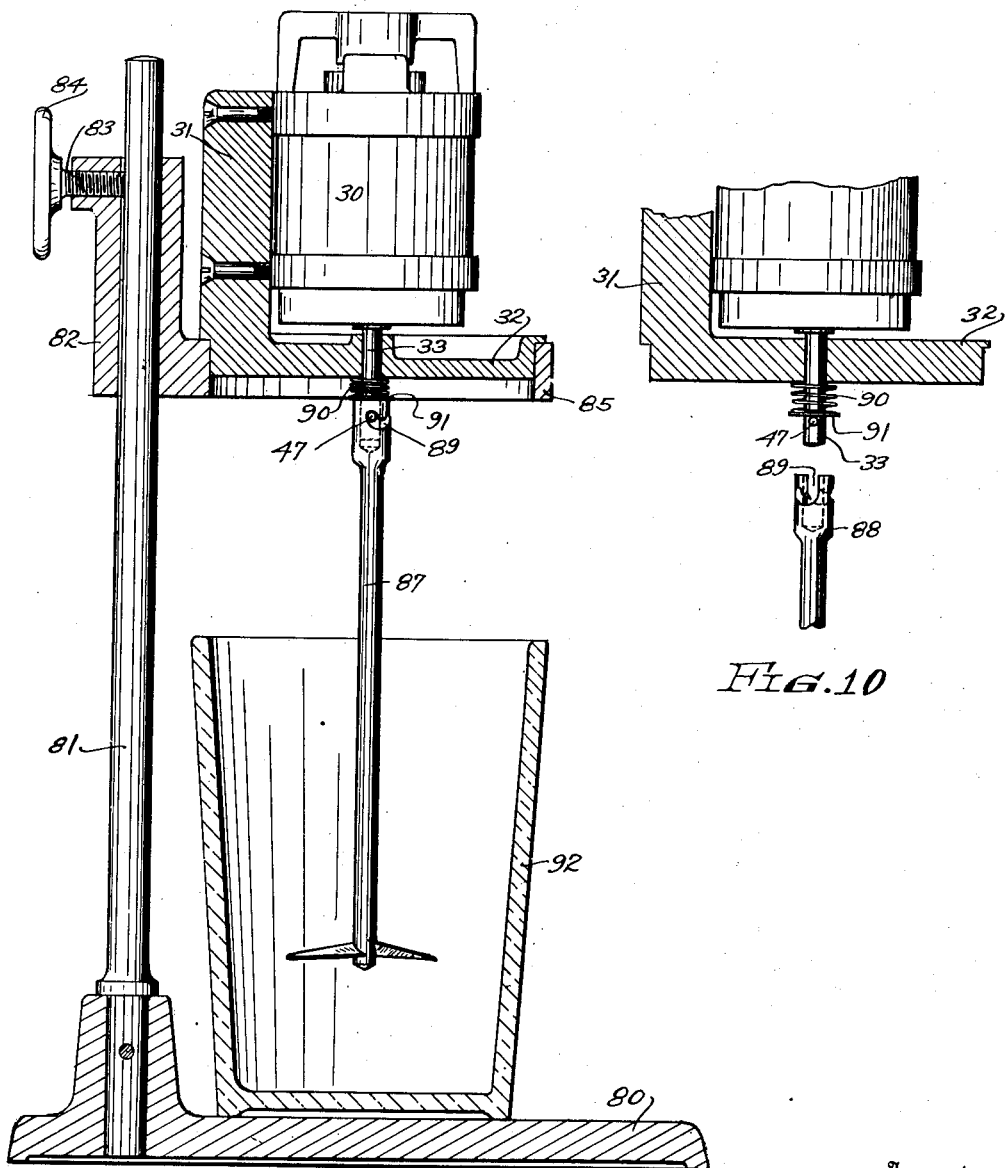

In the drawings, Fig. 1 is a vertical sectional view, showing my mixing device installed in a well-known type of domestic refrigerator; Fig. 1A is a cross-section through the flat conductor; Fig. 2 is a side elevation of one form of my mixing device; Fig. 3 is a vertical cross-sectional view of the modification shown in Fig. 2; Fig. 4 is a vertical cross-section taken along the line 4—4 of Fig. 3; Figs. 5, 6 and 7 are sections similar to Fig. 3, showing modified forms of driving mechanism; Fig. 8 is a vertical section, taken along the line 8—8 of Fig. 7; Fig. 9 is a vertical sectional view, showing stand and motor as used apart from the container; Fig. 10 is a detail showing the bayonet lock; and Fig. 11 is a wiring diagram showing electrical connections.

Referring now to Fig. 1 of the drawings, the upper part of a refrigerator is indicated generally at R, having top and side walls 21 and 22, respectively, a door frame 23 and a door 24. The compressor mechanism 25 is mounted on the top of the refrigerator, and within the refrigerator there is a substantially cylindrical, hollow walled expansion chamber, within the walls 26, 26a of which the liquefied refrigerant is allowed to expand, thus absorbing heat and cooling the refrigerator. A brine solution is ordinarily placed within the space between the walls 26 and 27.

Our mixing device is particularly adapted to be disposed within such an expansion chamber, and as shown in Fig. 3, it may comprise a motor 30 of any convenient type, but preferably a small series motor, rigidly mounted upon a laterally extending portion 31, which is formed integrally with a substantially cylindrical flanged plate 32. The motor shaft 33 may extend through a centrally disposed opening in the plate 32, and project slightly into a container 35. The container may be provided with an offset end portion 36, which is adapted to fit tightly around the plate 32, and which may be secured thereto by means of links 37 (see Fig. 2) pivotally mounted on the container, as at 38, and which are provided with knurled nuts 39, adapted to engage slotted ears 40 on the flanged plate.

In order to provide a bearing for the mixer, the interior of the closed end 41 of the container may be provided with a centrally disposed recessed portion 42, in which a suitable bearing block 43, having an opening 44, may be supported. This bearing block provides a support for one end of a shaft 45, to which paddles of any convenient form, such as wire loops 46, may be secured. The other end of the shaft, which is preferably hollow, surrounds the end of the motor shaft 33, and may be drivingly connected thereto by means of a pin 47, which may extend through the motor shaft and engage the edges of slots 48, formed in the end of the shaft 45.

In order to provide a heat conducting path between the container and the walls of the expansion chamber, the container may be supported by a shoe 50, which may be made of aluminum or other material having relatively high conductivity. The shoe 50 is preferably provided with arcuate outer and inner surfaces, which contact closely with the interior of the expansion chamber and the exterior of the container respectively, as shown in Fig. 4. In the form of our invention, shown in Figs. 1, 2 and 3, the laterally extending arm 31, which supports the motor, also contacts with the interior surface of the expansion chamber.

In Figs. 5 and 6, we show modifications of our device, wherein speed reducing mechanisms are interposed between the motor and the mixer. In the modification shown in Fig. 5, the motor is supported by an L-shaped arm 55, and thus the motor shaft is offset from the axis of the container. In this form the motor shaft 33a is provided with a pinion 56, which drives a spur gear 57, mounted on a shaft 58, which extends through the flange plate 32a. The shaft 58 extends into the container and is provided with means for driving the shaft 45 similarly to the means provided in the modification shown in Fig. 3.

The construction shown in Fig. 6 is similar to that shown in Fig. 5, except that the motor shaft 33b has mounted thereon a small friction pulley 60, which drivingly contacts with the interior of the periphery of a flanged disc 61. The disc 61 in turn is rigidly mounted upon a shaft 62, which drives the mixing paddles in the manner outlined above.

In Fig. 7, we have illustrated a modification embodying a variable speed drive connection, comprising an air clutch disposed between the motor and the agitator, whereby the motor is enabled to run at substantially constant speed while the agitator gradually slows down due to the thickening of the food while it is being frozen. In this device, the load on the motor increases only very slightly as the food is frozen, and the motor can be allowed to run without damage or excessive heating, even after the agitator has been stopped. The motor in this modification is secured to a block 65 and a cylindrical casing 66, which, in turn is supported by the flange plate 32c. A rotary impeller is mounted on the motor shaft 33c, and may comprise a plurality of blades 67, which may be formed integrally with the plate member 68. When the motor rotates air will be thrown outwardly by the blades 67, and will impinge on the driven blades 70, which may be secured to a plate 71. After the air has passed through the series of driven blades 70, it circulates in the direction shown by the arrows, and is returned to the central part of the impeller through openings 72 in the plate 71. The plate 71 may be secured to a shaft 73, extending through the flanged plate 32c, and which may be connected to the mixer shaft 45 in the manner as described above, in connection with the previous modifications.

In order to provide a convenient method for supplying electric power to the motor, the conductor 75 may have a flat cross-section, as shown in enlarged scale in Fig. 1A, for a sufficient distance from the motor to extend between the refrigerator door 24 and the door frame 23. Ordinarily, the doors and door frames of the refrigerators are provided with rubber bumpers which function to effect a seal between them. These rubber bumpers have sufficient flexibility to allow such a flat conductor to pass between the door and the door frame without danger of damaging either the conductor or the refrigerator. Thereafter, the conductor may lie along the top of the refrigerator and extend to a plug 76, which is usually provided on refrigerators of the type illustrated, and through which the power supply for the refrigerator compressor is connected.

As shown in Figs. 9 and 10, we have provided means whereby our mixing device may be used for purposes other than freezing food within the refrigerator. Such means comprises a stand having a heavy metal base 80, on which is supported an upright rod 81. A sleeve 82 may be slidably mounted on the upper part of the rod and may be held in place by means of a set screw 83, provided with a large knurled head 84. A ring 85 may be formed integrally with the sleeve and may be provided with an opening, into which the flanged plate 32 may be placed, the flange bearing on the upper surface of the ring. Thus the motor is conveniently supported in a vertical position, and various mixing implements 87 may be secured to the motor shaft 33, by means of a bayonet lock.

As shown in Fig. 10, the ends of the implement shafts are hollow, as at 88, and are adapted to surround the motor shaft. Curved slots 89 are provided, which engage the pin 47. To secure an implement to the motor shaft, it is only necessary to push it upwardly against the spring 90, and washer 91, and turn slightly to the right, whereupon it will be securely held in position by the action of the spring. To release the implement, it is pushed upwardly slightly and turned to the left. Various types of mixers may be employed. The one shown in the drawing at 87 is particularly adapted for whipping cream, and similar operations. The glass or bowl 92, in which the material to be mixed may be placed, may be supported by the base 80.

In mixing ice-cream and other substances a relatively slow speed is required during the freezing operation, for example, about 600 revolutions per minute, whereas for mixing mayonnaise, whipping cream, etc., the most satisfactory speed may be several thousand revolutions per minute. Therefore, we have provided a variable speed device, comprising a resistance for controlling the voltage impressed upon the motor. As shown in Fig. 11, the wiring arrangement for the speed control is extremely simple, comprising merely a variable resistance 95 having five taps, 96, 97, 98, 99 and 100 to which the motor 30 may be connected through an arm 101 and wires 102 and 103, thus providing for three separate speeds and an "off" position. Ordinarily, the slowest speed will be used when freezing ice-cream, and thus all of the resistance will be in the circuit. As the resistance will heat up somewhat, we have provided a separate unit containing the resistance which may be disposed outside of the refrigerator.

During the freezing operation, the material will gradually become thicker, the load on the motor will increase, and the motor will turn more slowly as time goes on. After the material has reached a certain consistency, any further stirring is useless and merely imposes an added load upon the motor. Therefore, in order to shut off the current when this point has been reached, we have provided a thermal overload switch indicated diagrammatically at 104. This switch is inserted in the circuit, so that it is only effective when the motor is running at its slowest speed, and when the tap 100 is employed.

In operating the device as an ice-cream freezer, the food materials are first placed in the container 35. The beater, including the shaft 45, and wires mounted thereon, is then inserted into the container and the end of the shaft seated in the bearing 43. Then the motor and the flange plate 32 are secured to the container, by means of the links 37. If desired, the motor may be started and the materials thoroughly mixed before being placed in the refrigerator. After the materials have been mixed, the entire assembly, including the container, the mixer, and the motor, are placed within the expansion chamber and in contact with the shoe 50. Then the conductor is brought out through the door, the door shut upon it, and it is then connected to the plug on the back of the refrigerator. The rheostat is set for the slowest speed, and the motor started. No further attention is necessary, as the motor will be automatically shut off as soon as the ice-cream reaches its proper consistency. In case the modification embodying the air clutch shown in Figs. 7 and 8 is employed, no overload switch is required. The motor will continue to operate within the refrigerator without damage to itself or the production of excessive heat even after the agitator has been stopped by the load. Thereafter, the material should be left in the refrigerator for the required length of time, to age and harden it properly. When the container and motor are separated, the pin 47 will slide out of the slot 48 and shaft 45, leaving the entire mixer within the container. This feature makes it possible to separate the motor from the container, and prevent the spilling of the ice-cream when the motor is removed.

From the foregoing description of a preferred form of our mixing device, it will be seen that we have provided various forms of a device which is readily adaptable for use as an ice-cream freezer within an ordinary domestic mechanical refrigerator, which operates efficiently, and which, after it is once started, needs no further attention until the food is removed from the container. It will also be seen that our mixing device can be adapted to many other uses, and that we have provided a simple and sturdy construction.

We claim:

1. In combination, a refrigerator, means for cooling said refrigerator including a gas expanding apparatus, said expanding apparatus being of hollow construction, and adapted to receive substances to be refrigerated, a container for holding food adapted to be disposed within the hollow space of the expanding apparatus, and means for supporting said container within the expanding apparatus, said supporting means comprising a member having relatively high heat conductivity and at least partially conforming to the interior surface of the expanding apparatus and the exterior surface of the container, whereby heat may be rapidly conducted from the container to the expanding apparatus.

2. In combination with a refrigerator, a cooling chamber, means to cool said chamber, a container for holding food and adapted to be disposed within said chamber, an agitator within said container, means including an electric motor associated with said container and drivingly connected with said agitator, a metallic shoe member having a surface substantially complementary to the surface of said container and a second surface substantially complementary to a wall of said cooling chamber, whereby said member may act to transmit heat from the container to the cooling means.

3. In a refrigerating apparatus, having a refrigerating cabinet provided with a refrigerating chamber, an electrically driven compressor apparatus and an electrical control mechanism therefor disposed exteriorly of the chamber, and including a gas expanding apparatus disposed within the chamber, said expanding apparatus being of hollow construction to form a space adapted to receive substances to be refrigerated, the combination of a container for holding food adapted to be disposed within said space of the expanding apparatus, means extending into said container for agitating the food therein while the same is being refrigerated, a motor attached to said means for operating the same and comprising with said means and container a unitary mechanism placeable in and removable from said space, and means for supporting said unitary mechanism within the expanding unit, said supporting means including a member adapted to make heat conductive contact with the interior of the expanding apparatus and the exterior of the container, said member being formed of material of high heat conductivity.

4. In combination, a refrigerator, a refrigerant expanding apparatus therein, said expanding apparatus being of hollow construction and adapted to receive substances to be refrigerated, a container for holding food and adapted to be disposed within the expanding unit, the cross-sectional area of the container being less than the cross-sectional area of the hollow space of the expanding unit, means extending into said container for agitating the food therein while the same is being refrigerated, a motor attached to said means for operating the same and comprising with said means and container a unitary mechanism placeable in and removable from the space in said expanding unit, and means for supporting said unitary mechanism within the expanding unit, said supporting means comprising a member adapted to engage the interior surface of the expanding apparatus and the exterior surface of the container in a manner to form a heat conducting path between the container and the expanding apparatus.

5. The combination with an electrically operated refrigerator apparatus having a hollow chamber surrounded by cooling surfaces, of a container for holding food adapted to be disposed within the hollow chamber, the cross-sectional area of the container being less than the cross-sectional area of the hollow chamber, and means for supporting the container within the chamber, said means comprising a member of high heat conductivity in face-to-face contact with the surface of the chamber and a large portion of the surface of the container and substantially filling the space between the container wall and the wall of the hollow chamber.

6. In combination with a refrigerator having a hollow cooling space, two casings, one adapted to receive food and having an agitator therein, and the other containing a motor drivingly associated with the agitator, a metal shoe in intimate heat conductive contact with one of said casings and having a surface of considerable extent substantially complementary to one interior surface of the cooling space.

7. In combination with a hollow cooling means, a container for food to be frozen, comprising a cylinder for receiving food, said cylinder being smaller in cross section than the internal transverse space of the cooling means, an agitator within said cylinder coaxial therewith, a motor mechanism having a driving shaft coaxial with the agitator and operatively connected therewith, and metallic means in intimate heat conducting relation to the container and having an outer surface which is substantially complementary to the inner surface of the cooling means over a substantial area whereby rapidly to conduct heat from the contents of the container to the cooling means.

8. In combination with a refrigerator having cooling means, a container for holding food and adapted to be positioned in close proximity to said cooling means, an agitator within said container, means including an electric motor associated with said container, lying adjacent the cooling means and adapted to drive said agitator, a metallic bearing member having a relatively high degree of conductivity connected with said motor and adapted to conductively engage the cooling means, whereby heat from said motor is dissipated independently of the contents of said container.

9. In combination with a hollow cooling mechanism, a container for food to be frozen, comprising a cylinder for receiving food, an agitator mounted within said cylinder coaxial therewith, a motor lying within the cooling mechanism and having its axis substantially in alignment with the axis of said cylinder and drivingly connected with said agitator, and a metal shoe secured to said motor and adapted to conduct heat therefrom to said cooling mechanism.

10. The combination with an electrically operated refrigerator apparatus having a hollow chamber surrounded by cooling surfaces, of a container for holding food and adapted to be disposed within the hollow chamber, an agitator in the container, a motor and means associated with the motor and agitator for driving the agitator at progressively slower speeds as the food congeals while the motor speed remains nearly constant.

11. The combination with an electrically operated refrigerator apparatus having a hollow chamber surrounded by cooling surfaces, of a container for holding food and adapted to be disposed within the hollow chamber, an agitator in the container, a motor having a shaft, and connective means between the motor shaft and agitator whereby the motor may revolve when the agitator is frozen in the food of the container, said connective means comprising a rotary air impeller member secured to the motor shaft, and a rotary air driven member operatively adjacent said impeller and drivingly connected to said agitator.

12. In combination with a refrigerating apparatus having a hollow cooling chamber, of a container for holding food and adapted to be disposed within the hollow chamber, an agitator in the container having a central shaft, a motor for driving the agitator shaft, a driving connection between the motor and the agitator shaft passing through an end wall of the container, and a detachable coupling between the driving connection and the agitator shaft, said coupling being within the container and adjacent one end thereof.

13. The combination with a refrigerator apparatus having a hollow cooling chamber, of a container for holding food and adapted to be disposed within the hollow chamber, an agitator in the container having a central shaft, a cover for the container, a motor for driving the agitator shaft, the driving connection between the motor and agitator shaft passing through the cover of the container, and a detachable coupling between the driving connection and the agitator shaft, said coupling being within the container and adjacent the cover.

14. In combination with a refrigerator apparatus having a hollow cooling chamber, of a container for holding food and adapted to be disposed within said hollow chamber, an agitator in said container having a central shaft, end walls for said container, one of said walls comprising a cover for said container, a motor for driving the agitator shaft, a driving connection between the motor and agitator shaft passing through one end wall of the container, a detachable coupling between the driving connection and the agitator shaft, said coupling being within the container and adjacent one end wall thereof, a bearing in the other end wall of the container and adapted to detachably receive the agitator shaft, whereby when the cover of said container is removed the agitator shaft may be withdrawn.

ALBERT R. GOLRICK.
JULIUS H. HILDEBRANDT.